Aug. 18, 1964   G. L. LEITHISER, JR   3,145,016
PULLEY ASSEMBLAGE FOR SUPPORTING ELECTRICAL TRANSMISSION LINES
Filed Feb. 27, 1961   3 Sheets-Sheet 1
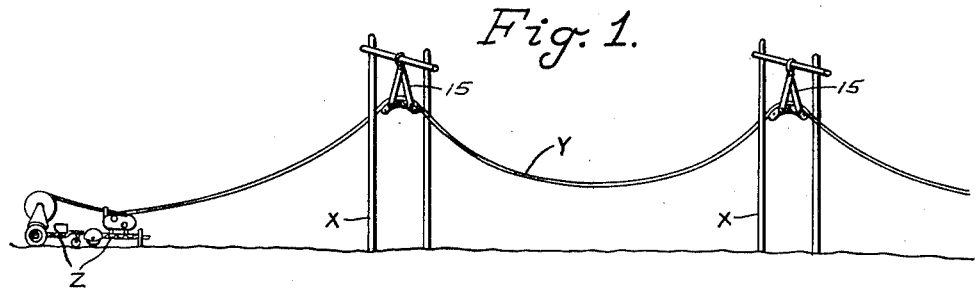
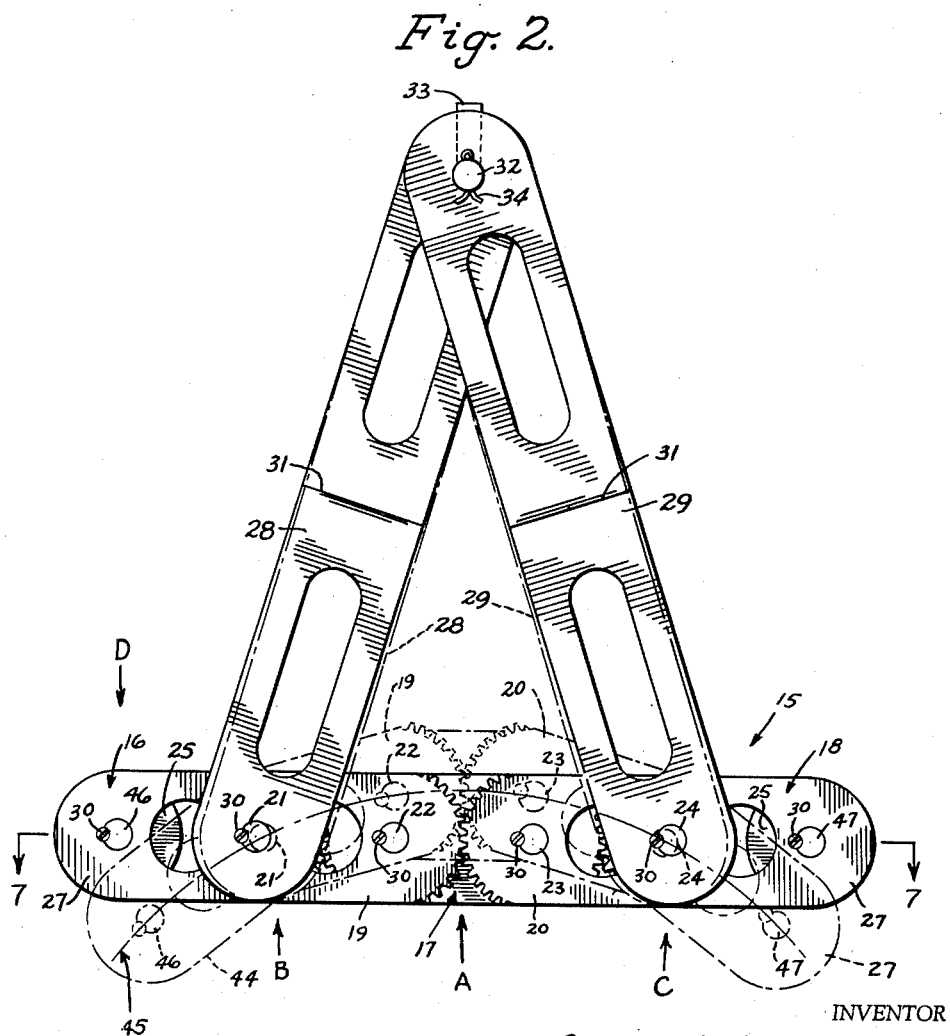
INVENTOR
GEORGE L. LEITHISER, JR.
BY
ATTORNEY Aug. 18, 1964  G. L. LEITHISER, JR  3,145,016
PULLEY ASSEMBLAGE FOR SUPPORTING ELECTRICAL TRANSMISSION LINES
Filed Feb. 27, 1961  3 Sheets-Sheet 2
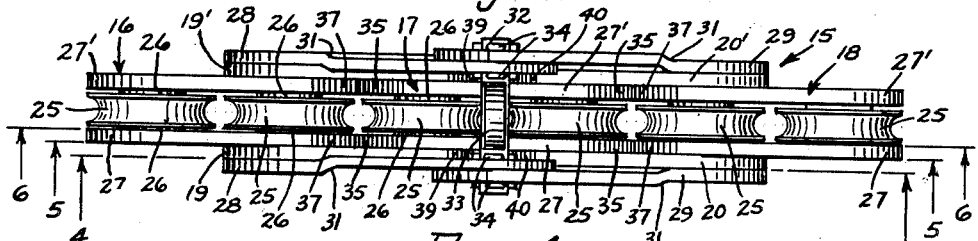
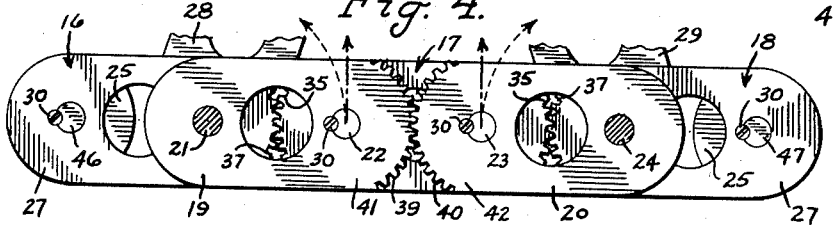
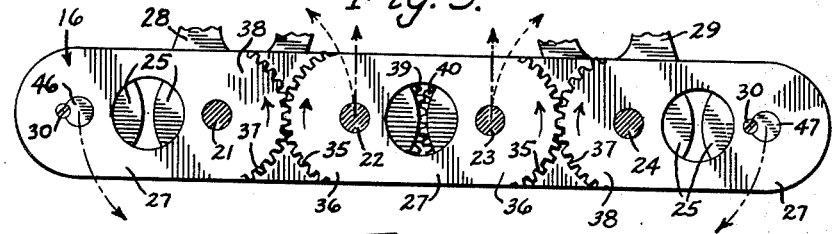
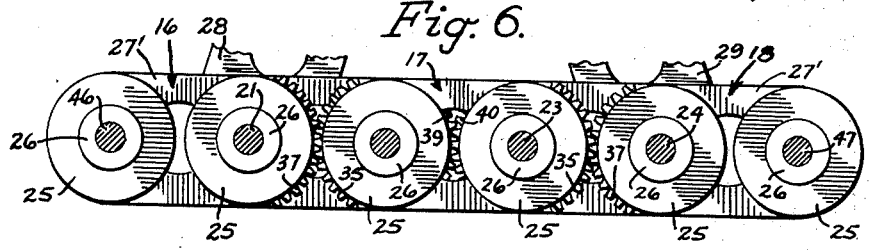
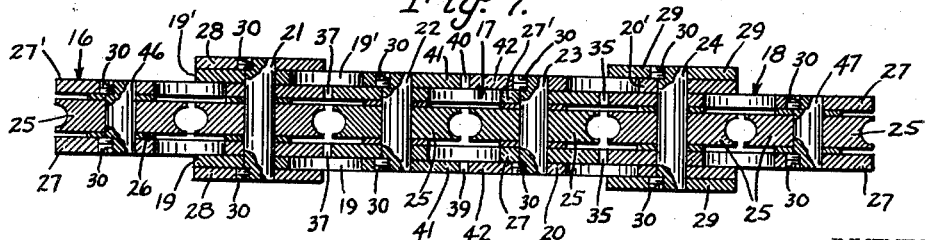
INVENTOR
GEORGE L. LEITHISER, JR.
BY
ATTORNEYS Aug. 18, 1964  G. L. LEITHISER, JR  3,145,016
PULLEY ASSEMBLAGE FOR SUPPORTING ELECTRICAL TRANSMISSION LINES
Filed Feb. 27, 1961  3 Sheets-Sheet 3
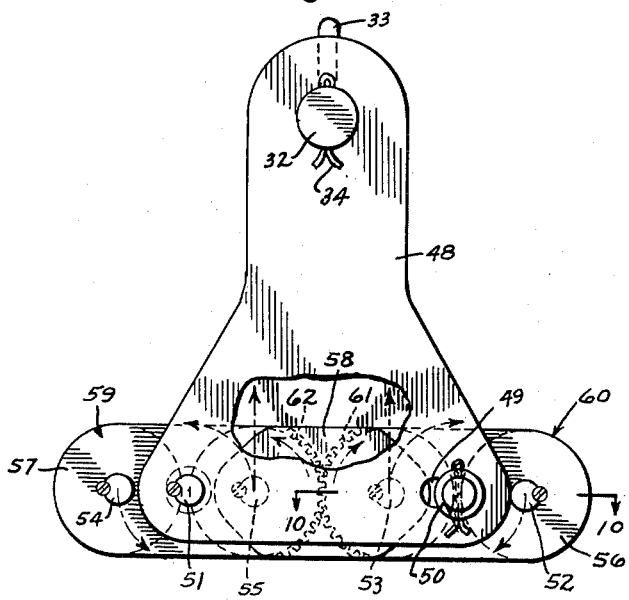
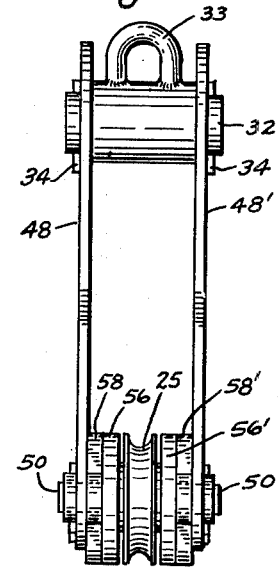
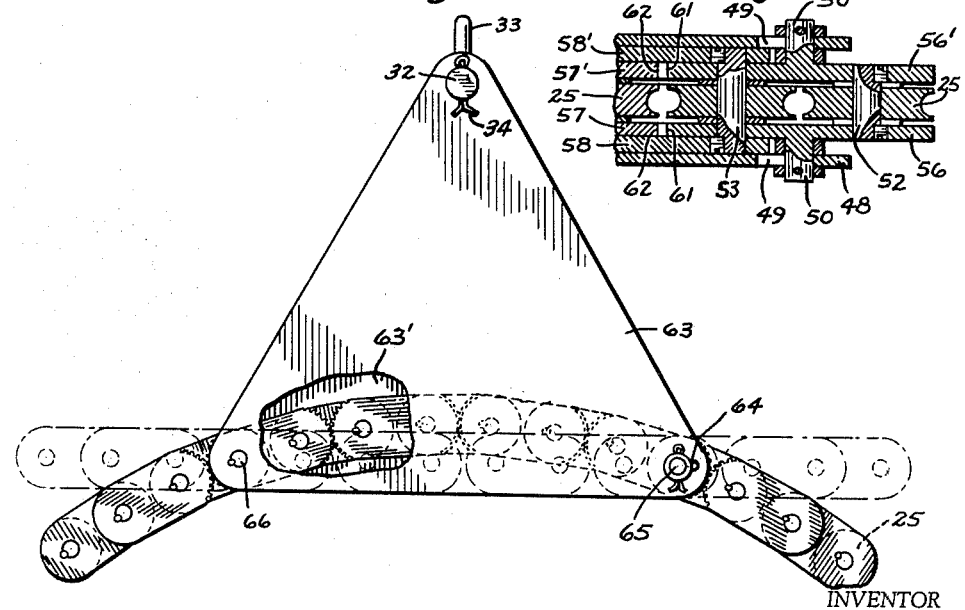
INVENTOR
GEORGE L. LEITHISER, JR.
BY
ATTORNEYS United States Patent Office 3,145,016
Patented Aug. 18, 1964

3,145,016
PULLEY ASSEMBLAGE FOR SUPPORTING
ELECTRICAL TRANSMISSION LINES
George L. Leithiser, Jr., R.D. 3, York, Pa.
Filed Feb. 27, 1961, Ser. No. 91,764
6 Claims. (Cl. 254—134.3)

This invention relates to a sheave or pulley assemblage for supporting electrical transmission lines during the tower stringing thereof.

In stringing electrical transmission lines, it is conventional practice to hang a pulley or block on the power cross arm to receive the pulling line by which a conductor is strung, and ultimately the conductor. After the conductor has been strung, the pulley is replaced by a clamping arrangement which secures the conductor to the string of insulators. Soft aluminum conductors are presently used for high voltage transmission lines and they are easily deformed in cross section and stranding configuration due to the fact that the strands are laid over fillers of twine, jute or paper to achieve a larger overall diameter such as will obviate the weight of internal metallic stranding which is of little value in conducting high voltage currents. Presently used single sheave stringing blocks present a very small area or point of support for the weight of the conductor and there is a tendency to deform the circular cross section and to provide abrasions on the conductor likely to result in corona discharge. Likewise, the high unit pressure at the point where the conductor rests on the sheave or pulley causes the relatively loose outer strands to separate from their closely laid positions resulting in a non-uniform surface with detriment to the transmission of high voltages. It is therefore a primary object of this invention to provide a pulley assemblage which will eliminate the possibility of bending the conductor sharply by insuring that the bend of curvature of the conductor will automatically assume a variably adjustable true arc, regardless of the angle assumed by the conductor relative to the vertical line of the supporting structure.

It is a further object of this invention to provide a multiple pulley assemblage for supporting electrical transmission lines by means of which an even distribution of the weight of the conductor will take place upon the pulleys or sheaves by virtue of a geared relationship of links or side plates included as part of the assemblage, and which geared links or plates support the pulleys. That is true whether the pulleys assume a position on short chords or true circles ranging from an infinite radius down to the shortest radius to which the device is constructed.

It is a further object of this invention to provide a pulley assemblage for supporting electrical transmission lines and the like comprising a plurality of pulleys which are mounted upon relatively geared side plates in multiple, such as in pairs, whereby during the stringing of a conductor line, the combined rotative forces on the pulleys effectively lock the entire assemblage together so that any movement of one pulley upon the axis of an adjacent pulley closes a like relationship between the rest of the pulleys, to make assured that the conductor will be suspended in a true arc throughout the length thereof. On the other hand, if the transmission line is truly horizontal, the pulleys through the geared plates will all be brought into position with their axes in the same horizontal plane, parallel with the line of the conductor.

Other objects and advantages of this invention will be apparent during the course of the following detailed description.

In the accompanying drawings, forming a part of this specification, and wherein various forms of invention are shown:

FIGURE 1 is a view showing a typical stringing operation, but using the improved pulley assemblage of the present invention.

FIGURE 2 is a side elevation showing the improved pulley assemblage in a preferred form of invention, and showing in dotted lines a different position of the pulleys for supporting a conductor line at the bend thereof where it is supported.

FIGURE 3 is a plan view of the pulley assemblage of FIGURE 2.

FIGURES 4, 5 and 6 are cross sectional views taken respectively on the lines 4—4; 5—5; and 6—6 shown in FIGURE 3 of the drawings.

FIGURE 7 is a horizontal cross sectional view taken substantially on the line 7—7 of FIGURE 2, and showing more particularly the geared plate or linkage arrangement and the pulleys supported thereby.

FIGURE 8 is a modified form of invention, showing a modified form of pulley assemblage provided with only four pulleys or sheaves.

FIGURE 9 is an edge elevation of the assemblage of FIGURE 8.

FIGURE 10 is a cross sectional view taken substantially on the line 10—10 of FIGURE 8.

FIGURE 11 is a further modified form of invention showing how the geared plates may be assembled with respect to a supporting strap arrangement for the support of a large number of pulleys; the same being intended to support a pulley on each shaft or axle shown in FIGURE 11; in which case there would be fourteen pulleys.

In the drawings, as shown in FIGURE 1, the letter (X) may generally designate a transmission line supporting tower upon which the improved pulley arrangements 15 are supported. The letter (Y) designates a present day transmission line, and the letter (Z) designates a cable or transmission line tension booster such as described in my co-pending application Serial No. 780,746, filed December 16, 1958, and now Patent No. 3,037,720, for aid in the stringing of transmission lines.

In the drawings, wherein similar reference characters designate corresponding parts throughout the several views, a pulley assembly 15 is shown composed of a plurality of pulley sub-assemblies 16, 17 and 18 pivotally joined to pairs of relatively geared side plates 19, 19' and 20, 20' by shafts or axles 21, 22, 23 and 24. Each pulley sub-assembly 16, 17 and 18 comprises a pair of freely rotatable pulleys or sheaves 25 on a pair of said axles; a pair of spacing washers 26 for each pulley 25, and a pair of relatively geared side plates 27 and 27' to complete the sub-assembly. A means of support is provided by diagonal relatively pivoted arms 28 and 29 whose lower ends support extensions of axles 21 and 24 secured against removal and rotation by threaded dutchman pins 30. Each of the pairs of side plates 19, 19', 20, 20', and 27, 27' are secured in a similar manner to their respective axles by threaded dutchman pins 30. The diagonal arms 28 and 29 may be outwardly offset at 31 to allow their upper ends to overlap without distorting their lower ends. A shaft 32 with a welded eye 33 secures arms 28 and 29 in a fixed relationship. Shaft 32 is drilled to receive cotter pins 34.

The side plates 27 and 27' of pulley sub-assembly 17 are provided with a series of gear teeth 35 in their proximate arcuate ends. The side plates 27 and 27' of pulley sub-assemblies 16 and 18 are likewise provided with a series of gear teeth 37 in only one of their arcuate ends 38 arranged in such a manner that gear teeth 35 and 37 are in a meshed relationship in each case. Side plates 19, 19' and 20, 20' are also provided with gear teeth 39 and 40 in their arcuate ends 41 and 42 arranged in such a manner that gear teeth 39 and 40 are in a meshed relationship in each case.

Referring to FIGURE 2, the pulley assembly is shown in full lines 43 with all of its connecting shafts in horizontal alignment. In the same view, the assembly is shown in dot and dash lines 44 with all of its connecting shafts disposed along an arcuate path 45. Considering the assembly shown in full lines as a unit with "A" at its center, it will be noted that a number of axles 21, 22 and 46 are arranged at left side B while an equal number of axles 23, 24 and 47 are similarly arranged at right side C. To function properly the support arm 28 must be secured at the mid point of side B which is at shaft 21. Arm 29 must be similarly secured at the mid point of side C which is at axle 24. If a vertical force is applied to the pulley of axle 46 in a downward direction as at D (FIGURE 2) sub-assembly 16 will tend to rotate in a counter-clockwise direction about the axle 21. The gear teeth 37 in rotating about axle 21 rotate the gear teeth 35 of plates 27, 27' in a clockwise direction about axle 22. At the same time axle 22 follows axle 46 in its counter-clockwise rotation about axle 21. However, since gear teeth 39 are rotating in a planetary manner about axle 21, gear teeth 40 are imparted in a clockwise rotation about axle 24. Here is a condition where two counteracting forces are applied to sub assembly 17, one a clockwise rotational force applied at axle 22 shown in dotted line and a counter-clockwise rotational force applied at axle 23, shown in dotted line. Since the adjacent center distances of all of the axles relative to one another are equal the forces applied are also equal. Therefore, these two counteracting rotative forces are combined and the resultant of these forces moves the entire sub-assembly 17 upward in a vertical direction with the axes of the axles 22 and 23 remaining parallel and horizontal. It further becomes obvious that as force D is applied to the pulley on axle 46 to provide a counter-clockwise rotation about axle 21, rotation is also transmitted in a similar degree, but of opposite rotation to that of its mating part to all of the intermeshed toothed parts resulting in axle 47 rotating clockwise about axle 24. It is apparent from this that in the case of a transmission line passing over the pulleys and the angle of approach of the line to the first pulley should be such as to exert an unequal force on it, or any of the other pulleys, they will adjust themselves in the proper true centered arcuate or straight path so as to equally distribute the force applied over all of the pulleys.

Other means of supporting the pulley assembly may be used instead of angularly adjustable pivoted arms 28 and 29 such as single plates or straps 48 and 48' provided with a slot 49 in each plate to allow for movement of one axle 50 due to the arcuate formation of the pulley assembly. FIGURES 8, 9 and 10 also illustrate the method of supporting each half of the pulley assembly, when each half contains two axles. This is accomplished by interposing pairs of studs 50 and 51 midway between axles 52 and 53 and axles 54 and 55. Studs 50 and 51 are integral parts of side plates 56 and 56' and side plates 57 and 57'. Connecting side plates 58 and 58' serve to unify sub-assemblies 59 and 60. The side plates 56 and 56' are each provided with a series of gear teeth 61 which are meshed with gear teeth 62 of each side plate 57 and 57'.

Referring to FIGURE 11 which illustrates an assembly with fourteen pulleys supported also by plates 63 and 63' and a slot 64 in each for adjustment of the center distance of shafts 65 and 66 due to arcuate formation of the assembly. It will be noted that in this instance, since each half of the assembly contains seven axles, the center axle (or fourth from each end) is used as a central point of support.

Each of the assemblies shown in FIGURES 2, 8 and 11 will operate in identical manner with respect to forces of rotation applied as described for FIGURE 2.

In the general assemblage the supporting frame or supporting means may consist of the side plates 27 and 27' of the pulley sub-assemblies and such terminology may also include the side plates 19, 19' and 20, 20' as well as the various axles 11, 22, 23, 24, 46 and 47, the arms 28 and 29 and straps 48.

Various changes in the shape, size and arrangement of parts may be made to the form of invention herein shown and described, without departing from the spirit of the invention or scope of the claims.

I claim:
1. In a device for supporting electric transmission lines and the like so that the transmission line at the locus of the device will be supported in a true arc the radius of which is variable according to the angle of load imposed on the line, the combination of a plurality of sub-assemblages each including a pair of relatively spaced side plates located in parallelism, said side plates of each sub-assemblage having a pair of relatively spaced axles mounted thereon in right angled relation to and between the side plates, pulleys mounted upon said axles between the side plates of each sub-assembly for rotation about the axes of the axles, the side plates of each sub-assemblage being arranged so that the side plates at one side of the pulleys are arranged in the same plane and the side plates at the opposite sides of the pulleys are arranged in the same plane, gear teeth mounted on the adjacent ends of said side plates at each side of the sub-assemblies in intermeshing relation, and means supporting said side plates so that a transmission line strung over said pulleys will tend to assume a true arc which is variable according to the angle of load imposed on the line.

2. In a device for supporting electric transmission lines and the like so that a bend in a transmission line is in the form of a true arc the radius of which varies according to the angle of the load imposed on the line, the combination of a plurality of sub-assemblages each including a set of spaced parallel side plates, a pair of spaced axles transversely connected to the side plates of each sub-assemblage, and a pulley connected to each axle of each sub-assemblage all of which lie in the same plane, said side plates at each side of the pulleys being arranged in the same plane and the adjacent ends thereof having gear teeth which are in intermeshing relation, said sub-assemblages including end sub-assemblages and an intermediate sub-assemblage, and means supporting said sub-assemblages so that the pulleys thereof will tend to support a transmission line in the form of a true arc the radius of which varies according to the angle of load imposed on the line.

3. The device described in claim 2 in which the supporting means comprises pairs of outer side plates, each pair of outer plates including a plate connected at each side of said sub-assemblages to one of the axles of the intermediate sub-assemblage and the adjacent axle of one of the end sub-assemblages, the outer side plates having their adjacent ends provided with gear teeth in intermeshing relation, and supporting arm means connected to axles remotely positioned from the axles most adjacent to the gear teeth of said outer plates constructed and arranged to permit said side plates to angularly relatively move on their intermeshing gear teeth with respect to each other to permit the transmission line at its locus of support upon the pulleys to assume the form of a true arc the radius of which may vary according to the angle of load imposed on the line.

4. In a device for supporting electrical transmission lines and the like so that a bend of the line at said device will assume a radius which is variable according to the angle of load imposed thereon, the combination of a plurality of sub-assemblages comprising an intermediate sub-assemblage consisting of spaced parallel side plates supporting transverse but spaced axles thereon and pulleys rotatably mounted for rotation about the axes of the axles, and outer sub-assemblages at each side of the intermediate sub-assemblage each also including relatively spaced side plates, axles supported transversely by the side plates of each outer sub-assemblage, pulleys mounted on the axles of the outer sub-assemblages for rotation about the axes thereof, all of said pulleys of the intermediate and outermost assemblages being located in the same plane and grooved to receive a transmission line, said side plates of the intermediate and outer sub-assemblages at each side of the line of pulleys, having intermeshing gear teeth at the adjacent ends thereof, said outer side plates at each side being mounted one upon each of the intermediate sub-assemblage and the remote ends of said outer side plates being connected to the most adjacent axle of the most adjacent outer sub-assemblage, the outer side plates at each side of the device having gear teeth at the adjacent ends thereof in intermeshing relation, and supporting means connected to relatively spaced axles aforementioned for supporting said sub-assemblages so they may move with respect to each other for variably changing the arching of a transmission line supported upon said pulleys.

5. The device described in claim 1 in which the supporting means comprises a pair of outer side plates at the opposite outer sides of certain similarly located sub-assemblages and mounted on similarly spaced axles of the most remotely positioned sub-assemblages and having the adjacent ends of said plates last mentioned located mid-way between the ends of the intermediate most of said sub-assemblages and which outer side plates at each side of the sub-assemblages have their adjacent ends provided with intermeshing gear teeth.

6. The device described in claim 5 in which the supporting means also includes pairs of elongated supporting arms to the lower ends of which are pivoted upon said similarly positioned axles to which the outer side plates at each side of the sub-assemblages are connected, and means pivotally connecting the upper ends of said supporting arms together on an axis transverse to the plane of the pulleys.

References Cited in the file of this patent

UNITED STATES PATENTS

| | | |
|---|---|---|
| 279,985 | Sharrett | June 26, 1883 |
| 2,926,001 | Mack et al. | Feb. 23, 1960 |
| 3,032,320 | Peterson | May 1, 1962 |
| 3,042,374 | Livingston | July 3, 1962 |

FOREIGN PATENTS

| | | |
|---|---|---|
| 991,668 | France | June 27, 1951 |
| 166,730 | Great Britain | July 27, 1921 |

UNITED STATES PATENT OFFICE
CERTIFICATE OF CORRECTION

Patent No. 3,145,016                  August 18, 1964

George L. Leithiser, Jr.

It is hereby certified that error appears in the above numbered patent requiring correction and that the said Letters Patent should read as corrected below.

Column 1, line 36, for "of", first occurrence, read -- or --; column 4, line 50, after "outer" insert -- side --; column 5, line 7, after "thereof," insert -- a pair of outer side plates mounted at each side of the sub-assemblages, --; column 6, line 7, strike out "to".

Signed and sealed this 1st day of December 1964.

SEAL)
Attest:

ERNEST W. SWIDER
Attesting Officer

EDWARD J. BRENNER
Commissioner of Patents